S.-TUDDENHAM.
Twisting Metals.
No 111,097.
6 Sheets—Sheet 1.
Patented Jan. 17, 1871.
Fig. 1.  Fig. 2.  Fig. 3.  Fig. 4.
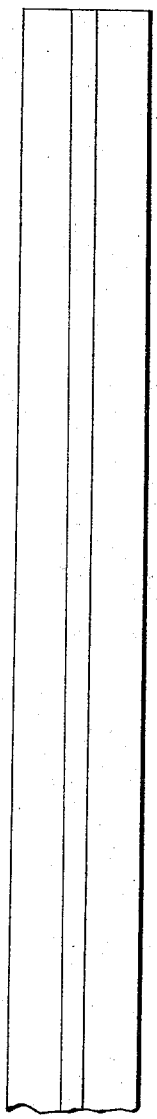  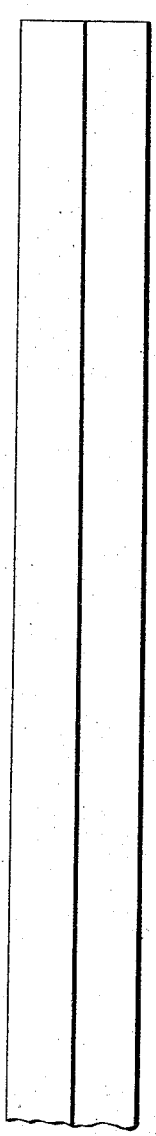 
Fig. 1.*  Fig. 3.*
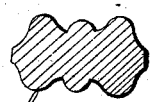 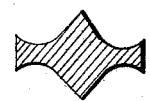 
Witnesses:
Inventor:
Stephen Tuddenham
by atty N. Pollok S. TUDDENHAM.
Twisting Metals.

Patented Jan. 17, 1871.

Witnesses:
W. Bailey
A. Moore

Inventor:
Stephen Tuddenham
by atty N. Pollok

S. TUDDENHAM.
Twisting Metals.
No 111,097.
Patented Jan. 17, 1871.
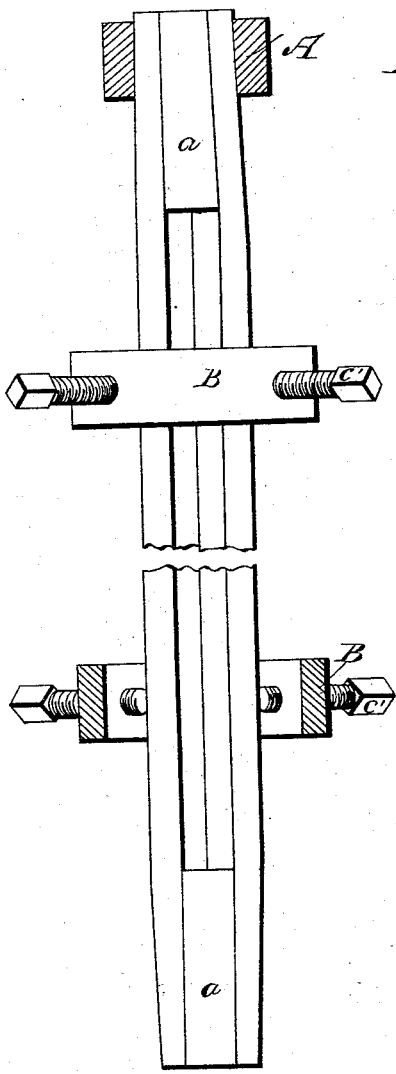
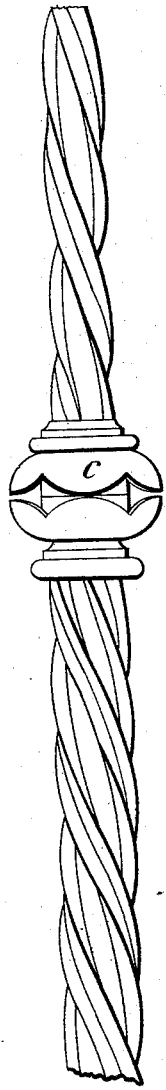
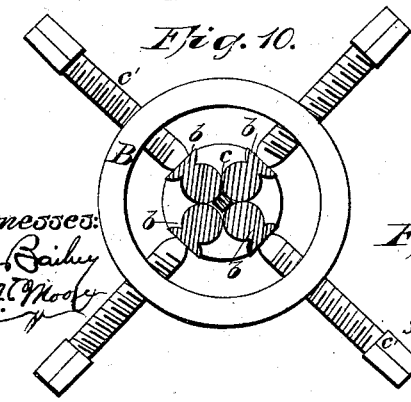
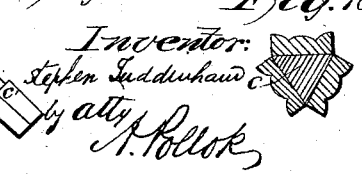

S. TUDDENHAM.
Twisting Metals.
No 111,097.
Patented Jan. 17, 1871.
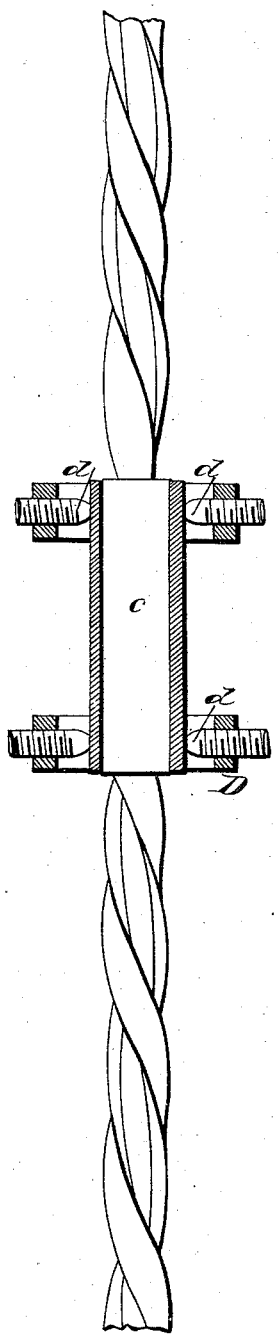
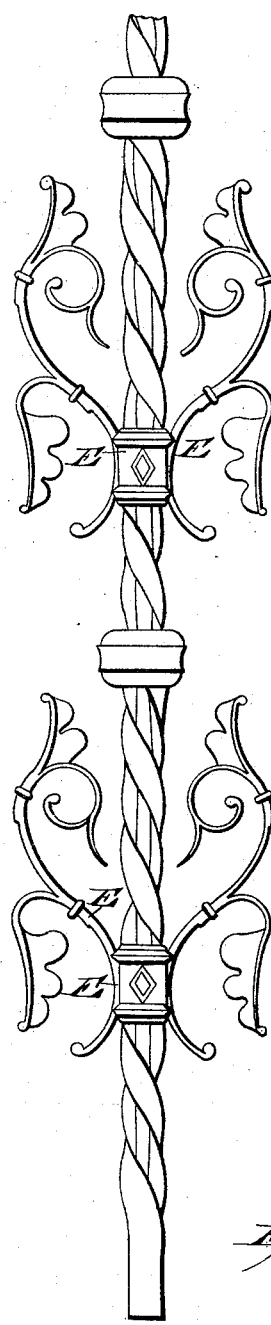

S. TUDDENHAM.
Twisting Metals.

No 111,097. Patented Jan. 17, 1871.

Witnesses:
W. Bailey
A. Moore

Inventor:
Stephen Tuddenham
by atty A. Pollok

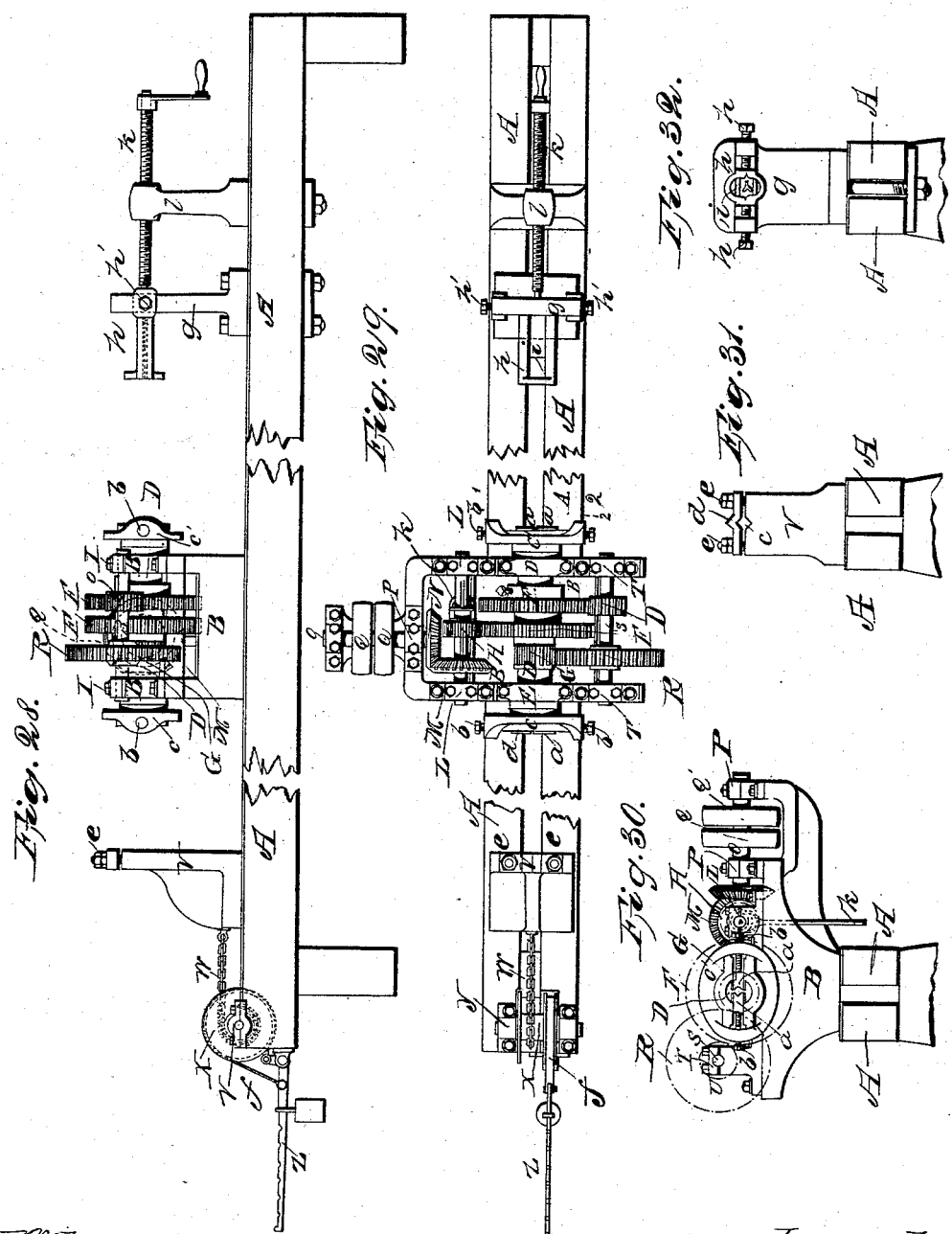

United States Patent Office.

STEPHEN TUDDENHAM, OF LOWER-MARSH, LAMBETH, ENGLAND.

Letters Patent No. 111,097, dated January 17, 1871.

IMPROVEMENT IN THE MANUFACTURE OF ORNAMENTAL BARS OR RODS OF METAL.

The Schedule referred to in these Letters Patent and making part of the same.

I, STEPHEN TUDDENHAM, of Lower Marsh, Lambeth, in the county of Surrey, England, have invented Improvements in the Construction and Manufacture of Iron or Metal Rails, Rods, or Bars, for balconies, gates, railings, pillars, standards, or columns, and other useful purposes, and also in the machinery employed therein, of which the following is a specification.

This invention relates—

First, to the twisting (either singly or in groups) of bars or rods which have been previously specially prepared with devices that are subservient to the ornaments or form intended to be given to the completed bar or rod, and has reference also to the mode of applying ornamental bosses or sockets and scrolls to such twisted bars; and, Secondly, to the machinery and means employed for twisting and finishing the said bars or rods.

In carrying my invention into effect I propose, first, to roll straight bars or rods of wrought-iron or other ductile metal, of such form or cross-section as may be required in order to produce a twisted bar or rod of the required ornamental figure.

When the rod or bar has been prepared by making it of the required sectional figure, I twist it by means of the machinery hereinafter described, the bar or rod being either in a cold state, or, if necessary, heated, according to the quality of metal or form of the cross-section.

By this process I produce extremely ornamental helical devices, superior in appearance to, and much stronger and tougher than, any that can be produced direct in cast metal by molding from patterns, because, by properly designing the outline of the section of the prepared bars, I am able to produce, by the after process of twisting, various ornamental devices, the members of which may be much more under-cut, the hollows much deeper, and the edges much sharper than the casting process will admit of, and the effect produced is consequently more artistic.

In some cases the various sectional forms of the prepared rods or bars may have formed upon their surfaces such ornamental devices as scrolls, flowers, leaves, or other projecting bas reliefs, and then by giving the metal the requisite twist the appearance of the rods or rails will be greatly improved.

I also propose to employ, for some purposes, prepared bars or rods of steel, copper, or other metals, or their alloys, and likewise to combine with iron or steel ornamental bars of copper, gun-metal, or brass, or other metal, so as to produce a still more ornamental article.

Although I have referred to the production of the straight bars or rods of ornamental section as being proposed to be effected by the direct process of rolling, I sometimes employ prepared bars or rods made by casting them in molds made from straight patterns, of the desired ornamental form or section, which rods may or may not have cast with them ornamental heads or pedestals, also flowers and other ornamental devices. When I employ cast-iron in this manner I anneal the straight bars or rods so as to convert them into a sufficiently ductile material to admit of their being afterward twisted, while in the case of castings of gun-metal, or other soft alloys or metals, the metals may be cast sufficiently ductile to enable it to be twisted without such process.

The rolled rods, first referred to, may likewise have ornamental heads or pedestals cast on them, either before or after twisting, any of which modifications of my invention can be made to produce very highly ornamental articles.

In some cases, before or after twisting the ornamental bars or rods, I, for some purposes, twist one or more of them round a mandrel or otherwise, or I twist one or more of them together, so as to produce an ornamental hollow or solid helical column or standard.

Sheets 1 and 2 of the accompanying drawing represent some examples of the devices produced by this process.

Figures 1, 3, 5, and 7 show elevations of straight rods before twisting, (each of the ornamental sections shown at $1^x$, $3^x$, $5^x$, and $7^x$, respectively.)

Figures 2, 4, 6, 8, show the effect produced by twisting the said straight bars respectively, from which it will be seen that an immense variety of designs may be produced by varying the outline of the section of the straight bars.

I further propose, when twisting several of the prepared bars together, to lay them parallel, or to group them in such a position as will give the ornamental effect required, and to hold such bars in their respective places, while their ends are being welded together, by means of rings or ferrules, as shown at A in Figure 9, and small wedge or filling-pieces, $a\ a$, applied to the ends thereof, in conjunction with lead strips in the intermediate portion, such lead strips or filling-pieces and wedges being inserted between the fillets or projecting ribs $b\ b$, shown also in the cross-section of one of the group of bars, detached, at Figure 11, which have been previously formed on the bars.

$c$ is a central bar or core of rectangular section, round which the prepared bars are arranged.

The ends of the bars, when made of iron or steel, are welded together along with the end filling-pieces $a\ a$, but when a metal is used which is not capable of welding, then the ends may be secured by screw-clamps, or by brazing in lieu of ordinary ferrules. Screw-clamps are, however, in all cases employed for keeping the several bars of the group in their respective places during the operation of twisting, these latter being placed at intervals, as shown at B B in Figures 9 and 10, along the group, and tend to equalize the twist and insure uniformity therein.

These bars, so grouped and held together by the screws c' c' of the screw-clamps, may be twisted together so as to form a compound twisted bar, as shown in Figure 12, having either a solid or a hollow section.

These groups of twisted bars, as well as single twisted bars, are in all cases twisted while in a cold state, and are sometimes ornamented by having socket-pieces or bosses, C, placed thereon, as shown in Figures 13 and 14, such socket-pieces or bosses being formed with an opening therein, of a shape corresponding to the section of the group or to that of the single bar, as the case may be, and are secured in their places by the act of twisting the bars.

Figure 15 is a section of two bars placed back to back, which, when twisted together, produce the design shown in the upper part of fig. 13.

Figure 16 is a section, showing the form and arrangement of three bars disposed round a triangular bar or core, c, which, when twisted, produce the design shown in the lower part of fig. 13.

Figure 17 is a section of the single bar, which, when twisted, produces the design shown in fig. 14.

In order to prevent the socket-pieces or bosses, when of a weak section, from being burst open or split by the twisting of the bars, I support or strengthen them, during the operation of twisting, by means of screw-clamps or rings, D D, provided with screws, d d, (see Figure 18,) at each end, where practicable, suitable bearing or pressing-plates, e e, being interposed between the screws of the clamps and the sides of the socket-pieces or bosses C.

Further ornamental effects may be obtained by forming leaves or branches or scroll-work, E, upon such bosses, as shown in Figure 19, and by twisting into the group of bars branches or scroll-work carrying leaves, fruit, or flowers.

In some cases I produce highly ornamental twisted metal-work by combining together bars of different sections and of different metals, as shown in Figures 20 and 21, where—

$f f$ are two wrought-iron bars, combined together with a flat bar or rod of brass, $g$, formed with round, square, or other-shaped bends or fillets on each edge, the flat part of the bar $g$ fitting in between the bars $f$, the same being held together during the operation of twisting by the screw-clamps hereinbefore referred to, placed at such intervals along the bars as to insure uniformity of twist.

One or other of the bars may have leaves, branches, or scroll-work formed thereon before it is twisted, whereby a further ornamental effect will be produced.

Figure 5:
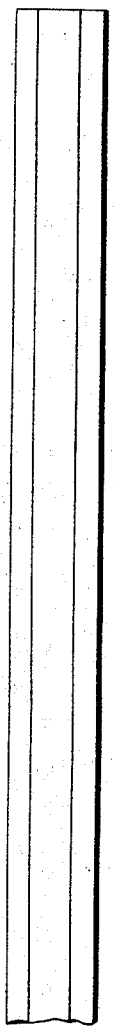
Figure 6:
Figure 7:
Figure 8:
Figure 5:
Figure 7:
Figure 22:
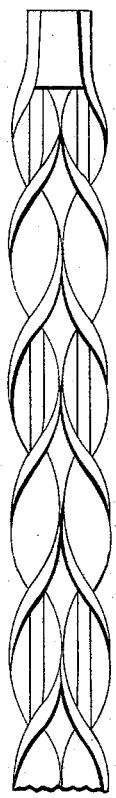
Figure 23:
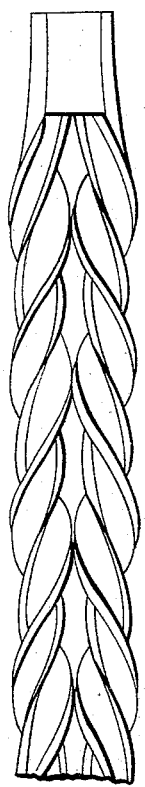
Figure 26:
Figure 24:
Figure 25:
Figure 27:

Figures 22 and 23 represent the production of an ornamental device by combining together two or more bars twisted in opposite directions; and Figures 24 and 25 represent corresponding sections of the bars so twisted and combined.

Figure 28, sheet 6, of my drawing, represents a side elevation of my improved twisting-machine for producing ornamental or other twisted work.

It is here shown as a double machine, so as to be capable of twisting two bars in opposite directions at the same time, or of twisting a right-hand and left-hand thread on two portions of one and the same bar.

Moreover, with a view to regulating with greater accuracy the amount of longitudinal tension on the bar while undergoing the operation of twisting, and thereby controlling more effectually the degree of shortening of the said bar during such operation, I have combined with the movable holder or headstock an adjustable brake.

Figure 29 is a plan of the machine corresponding to fig. 28.

Figure 30 is a transverse vertical section of the machine taken along the line 1 2, in fig. 29, and showing a face view of one of the pair of rotatory chucks.

In the several figures hereinbefore last referred to—

A represents a long lathe-bed, and

B is a stationary poppet-head, carrying the gearing for actuating the two rotatory chucks C C'.

These two chucks are each made fast on the respective ends of the tubular shaft D, working in suitable bearings E E in the poppet-head.

A dovetailed groove is made diametrically across the face of each chuck, in which groove are fitted two adjustable dies or holders, $a\ a$, fig. 30, capable of grasping and firmly holding in a central position one end or other portion of the bar to be twisted, the said holders $a$ being tightened up and adjusted, so as to hold the bar in the axial center of the chuck by the tightening or adjusting screws $b\ b$.

In my drawing I have shown the application of double driving-gear to the machine, but it is obvious that single gear may be employed, provided the power is sufficient to perform the work in hand.

This gearing consists of a spur-wheel, F, fast on the tubular shaft D, and a second spur-wheel, F', and pinion, G, formed thereon, running loose on such shaft.

H is a driving-pinion, sliding along a feather on the shaft I, and thrown into gear with the wheel F or F', as the case may be, by means of a clutch-lever, K.

The shaft I works in bearings L L, and carries a miter-wheel, M, which derives motion from the miter-wheel N, fast on the driving or first-motion wheel O, which works in the bracket-bearings P P, and is provided with the ordinary fast-and-loose driving-pulleys Q Q'.

The pinion G, before referred to, gears into the spur-wheel R fast on the shaft S, which works in the bearings T T.

This shaft S carries a pinion, U, which gears into the spur-wheel F fast on the tubular shaft D.

The drawing, fig. 29, shows the gearing adjusted for double power, the rotatory motion of the chucks being transmitted through the pinion H, wheel F', pinion G, wheel R, pinion U, and wheel F. By simply moving the pinion H so as to bring it into direct gear with the wheel F, then the power will be reduced. In this latter case the pinion U may also be thrown out of gear with the wheel F, so as to leave the gearing F', G, R, and U at rest; or, in lieu of this arrangement, the pinions H and U may be both fast on their shafts I and S, and the shaft S, with its gearing R and U, made to slide to and fro by means of an eccentric motion or sliding bearings worked by a single lever, whereby the wheel R and pinion U can be thrown in or out of gear with the pinion G and wheel F, as required, the wheels F and F' being connected together when single power is required by a locking-bolt or pin passing through them.

V is the sliding headstock or holder, shown also at Figure 31, which grasps the outer end of the bar to be twisted, the square-sided end of such bar being nipped in the rectangular opening $c$, fig. 31, formed between the body of the headstock and the cap $d$, which latter is tightened by means of the bolts $e\ e$.

The opposite end of the said bar is also griped between the adjustable dies or holders $a\ a$ in the chuck C, and on imparting a slow and powerful rotatory motion to such chuck the bar is gradually twisted to any desired extent.

In order to allow of the shortening of the bar during the twisting process, and, at the same time, to exert just so much resistance to longitudinal contraction as will insure uniformity in the spirals, the head-stock V is allowed to slide along its bed, but is con trolled in its movement by connecting it by a chain, W, to a windlass-barrel, X, the shaft of which works in bearings fixed to the end of the bed.

This shaft carries a brake-wheel, Y, round which a brake-strap, f, is passed and tightened, more or less, by the adjustable brake-lever, Z.

If two bars be required to be twisted at the same time in opposite directions, or if a single bar is to be twisted in opposite directions at each end, by passing it through the tubular shaft D and holding it by one or other of the chucks C C', a similar sliding head-stock and brake will be fitted to the opposite end of the bed.

I am aware that bars of rectangular section have been twisted, and that gates have been made of such bars; I am also aware that bars of various sections have been used in the manufacture of twisted nails; but the invention herein described contemplates an article which is entirely distinct and different from those above named, and which, as to design and ornamental effect, is not suggested by anything heretofore in use.

What I claim, therefore, and desire to secure by Letters Patent, is as follows:

1. As a new article of manufacture, ornamental bars or rods, such substantially as herein shown and described, made by twisting bars or rods, previously prepared as to their shape, in cross-section and to their surface, with special reference to the subsequent operation of twisting, and to the character or kind of ornamentation to result from such twisting, as herein set forth.

2. The method of attaching socket-pieces or bosses to the bars, whether said pieces be plain or ornamented, by fitting the same upon the bars before twisting them, and then securing said socket-pieces or bosses in their places by the operation of twisting said bars, as described.

3. The clamping device, substantially as described and illustrated in figs. 9 and 10, for holding the several bars of the group together and in their proper relative positions while subjected to the operation of twisting, as set forth.

In testimony whereof I have signed my name to this specification in the presence of two subscribing witnesses,

STEPHEN TUDDENHAM.

Witnesses:
    FRED. WALKDEN,
        47 *Lincoln's Inn Fields, London,*
    CHAS. MILLS,
        47 *Lincoln's Inn Fields, London.*